United States Patent [19]
Miller et al.

[11] Patent Number: 5,351,323
[45] Date of Patent: Sep. 27, 1994

[54] OPTICAL FIBER FOR COUPLING TO ELLIPTICALLY-SHAPED SOURCE

[75] Inventors: William J. Miller, Corning; Robert A. Modavis, Painted Post; Thomas W. Webb, Horseheads, all of N.Y.

[73] Assignee: Corning Incorporated, Corning, N.Y.

[21] Appl. No.: 148,291

[22] Filed: Nov. 8, 1993

[51] Int. Cl.$^5$ .............................................. G02B 6/26
[52] U.S. Cl. ..................... 385/28; 385/30; 385/33; 385/31; 385/42; 385/43
[58] Field of Search ............... 385/11, 12, 14, 15, 385/27, 28, 29, 30, 31, 33, 35, 38, 42, 43, 88; 250/227.11

[56] References Cited

U.S. PATENT DOCUMENTS

| | | | |
|---|---|---|---|
| 4,143,940 | 3/1979 | Khoe | 385/31 X |
| 4,370,021 | 1/1983 | Khoe et al. | 385/31 X |
| 4,531,811 | 7/1985 | Hicks, Jr. | 385/11 X |
| 4,755,021 | 7/1988 | Dyott | 385/11 X |
| 4,763,975 | 8/1988 | Scifres et al. | 385/31 X |
| 4,828,350 | 5/1989 | Kim et al. | 385/30 X |
| 4,906,068 | 3/1990 | Olson et al. | 385/43 X |
| 5,224,182 | 6/1993 | Murphy et al. | 385/43 X |
| 5,261,017 | 11/1993 | Melman et al. | 385/28 X |
| 5,265,177 | 11/1993 | Cho et al. | 385/14 |
| 5,278,926 | 1/1994 | Doussiere | 385/28 |
| 5,283,847 | 2/1994 | Sasaoka et al. | 385/43 |

*Primary Examiner*—Brian Healy
*Attorney, Agent, or Firm*—William J. Simmons, Jr.

[57] ABSTRACT

An optical system for coupling a laser radiation source to a circularly symmetric single-mode optical fiber. The laser radiation source produces a beam of light having an elliptical mode field. The input end of a coupling fiber, which has a core that is elliptically-shaped in cross-section, is situated in light receiving relationship with respect to the source. The coupling fiber is oriented with respect to the source such that the mode field of the source is aligned with the coupling fiber core to provide the most efficient coupling of light from the source to the fiber. Means such as an evanescent coupler couples light from the output end of the fiber to the circularly symmetric fiber.

11 Claims, 1 Drawing Sheet

OPTICAL FIBER FOR COUPLING TO ELLIPTICALLY-SHAPED SOURCE

BACKGROUND OF THE INVENTION

The present invention relates to a coupling element for coupling a source of elliptically-shaped radiation such as a laser diode to a conventional circularly symmetric single-mode optical fiber, and to a method of making such element.

The coupling efficiency between laser diodes and conventional single-mode fibers is affected by the aspect ratio of the radiating area of the diodes. The elliptically shaped laser mode must be transformed into an appropriately sized, circularly symmetric fiber mode.

A circularly symmetric lensed fiber that is situated several microns in front of the laser facet can be employed if the light beam is fairly round, i.e. if its aspect ratio is no greater than 2:1. One such scheme has been reported to provide a coupling efficiency of 90%. However, typical laser diodes are much more elliptical (aspect ratio of about 3.5:1) for which the maximum coupling efficiency to a circularly symmetric lensed fiber is about 65–70%.

A more efficient coupling between a laser diode and a circularly symmetric single-mode fiber has been effected by heating the end of the fiber and then flattening it to provide the desired aspect ratio. Such a method is disclosed in U.S. Pat. Nos. 4,370,021 and 4,763,975. Because of viscosities of the fiber core and cladding glass during flattening step, core glass emerges from the fiber endface in form of semi-ellipsoidal lens. The shape of a lens that is formed by flattening the end of the fiber is not easily controllable; it is usually too steep to provide the desired focusing properties.

In a modification of the above-described method, the endface of the flattened fiber end portion is presumably ground flat, since a reflecting layer that forms part of the laser is deposited on the end of the fiber core. Thereafter, a lens is added to the fiber endface by applying thick layer of photoresist on the elongated endface which is then exposed via the fiber core and developed. The curvature of the resultant semi-ellipsoidal lens cannot be shaped independently of the aspect ratio.

SUMMARY OF THE INVENTION

It is therefore an object of the present invention to provide an improved optical system for coupling light from a radiation source, which produces a beam of light having an elliptical mode field, to a circularly symmetric fiber. A further object is to provide an optical coupling system that will overcome the heretofore noted disadvantages of prior art devices.

Briefly, the present invention relates to an optical system for coupling light from a radiation source to a circularly symmetric fiber. The source, which is a laser diode or the like, produces a beam of light having an elliptical mode field, and therefore, its light is inefficiently coupled directly to a circularly symmetric single-mode fiber. The coupling system comprises an optical fiber having a core that is elliptically-shaped in cross-section. The input end of the elliptical core fiber is situated in light receiving relationship with respect to the radiation source, the fiber being oriented with respect to the source such that the mode field of the source is aligned with the fiber core to provide the most efficient coupling of light from the source to the fiber. Means are provided for coupling light from the output end of the elliptical core fiber to the circularly symmetric fiber.

DESCRIPTION OF THE PREFERRED EMBODIMENTS

Figure 1:
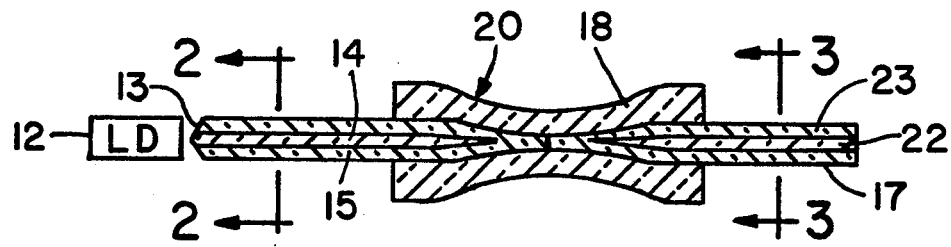
FIG. 1 is a cross-sectional view of an embodiment of the present invention.
Figure 2:
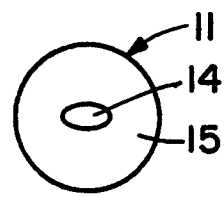
FIG. 2 is a cross-sectional view taken along lines 2—2 of FIG. 1.
Figure 3:
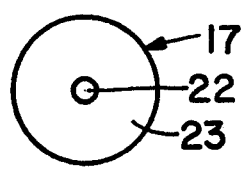
FIG. 3 is a cross-sectional view taken along lines 3—3 of FIG. 1.

FIG. 1 shows an elliptical core fiber 11, an endface 13 of which is positioned adjacent the light emitting region of laser diode 12. As shown in FIG. 2, fiber 11 has an elliptical core 14, and therefore it has an elliptical mode field. The outer surface of cladding 15 is circular in cross-section. Fiber 11 can be manufactured in accordance with the teachings of U.S. Pat. Nos. 5,149,349 and 5,180,410, for example. Endface 13 can be provided with a lens to facilitate the capture of light by core 14 and to direct away from the laser facet any light that reflects from the endface. The lens can be conical as shown in FIG. 1. Apparatus such as that taught in U.S. Pat. No. 4,818,263 can be used to form the lens. An angle of 85° with respect to the fiber axis is an acceptable cone angle. The end of the fiber may be located about 2–3 μm from the laser diode. Theoretical calculations indicate that an ideal lensed elliptical core fiber can capture 90% of the laser mode.

Figure 1A:
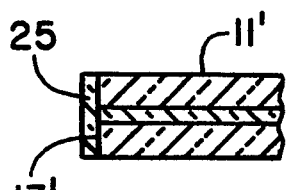
FIG. 1a is a cross-sectional view of a modification of the coupling fiber of FIG. 1.

Instead of applying a lens to the endface of fiber 11, its endface 13' can be provided with an antireflection coating 25 as shown in FIG. 1a. However, such a coating is difficult to apply and may become heated by the laser light to a temperature sufficient to cause it to degrade.

The light propagating in fiber 11 may be coupled to a circularly symmetric fiber by an evanescent coupling technique. As shown in FIG. 1, the end of fiber 11 opposite endface 13 is fused to circularly symmetric fiber 17. A glass tube 18 is threaded over the fibers until the fused region is located midway along the tube, and the central region of the tube, which includes the fused region of the fibers, is heated and stretched to reduce the diameter thereof. The dimensions and taper of the resultant coupler 20 are such that a single-mode signal propagating in fiber 11 initially has a mode field that is guided by and substantially confined to core 14. As the core diameter decreases, the mode field expands. Eventually, a point is reached when the field is no longer guided by the core but is effectively guided by the waveguide consisting of cladding 15 and tube 18. This expanded mode field couples to the other half of coupler 20 in which the field initially propagates in a waveguide consisting of cladding 23 of fiber 17. In the up-taper region of coupler 20, where core 22 of fiber 17 gradually increases in diameter, the mode field becomes guided by core 22. Techniques for forming such couplers are described in U.S. Pat. No. 4,763,976 and in the publication K. P. Jedrzejewski et al. "Tapered-Beam Expander for Single-Mode Optical Fiber Gap Devices", Electronics Letters, 16th Jan. 1986, vol. 22, No. 2, pp. 105–106.

Figure 4:
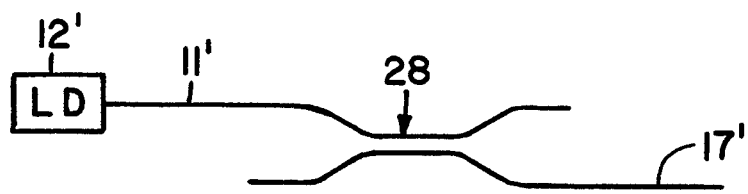
FIG. 4 is a schematic illustration of a further embodiment of the invention.

Another evanescent coupling technique is schematically illustrated in FIG. 4, wherein elements that are similar to those of FIG. 1 are represented by primed reference numerals. Instead of fusing the end faces of fibers 11 and 17, the end portions of both fibers are overlapped so that they extend in side-by-side fashion. The adjacent fibers are then heated and stretched until the desired coupling occurs. To provide the resultant coupler 28 with mechanical strength, the fibers can be inserted into a glass tube prior to the heating and stretching steps. A suitable technique for forming such an overclad fiber optic coupler is disclosed in U.S. Pat. No. 4,931,076.

Figure 5:
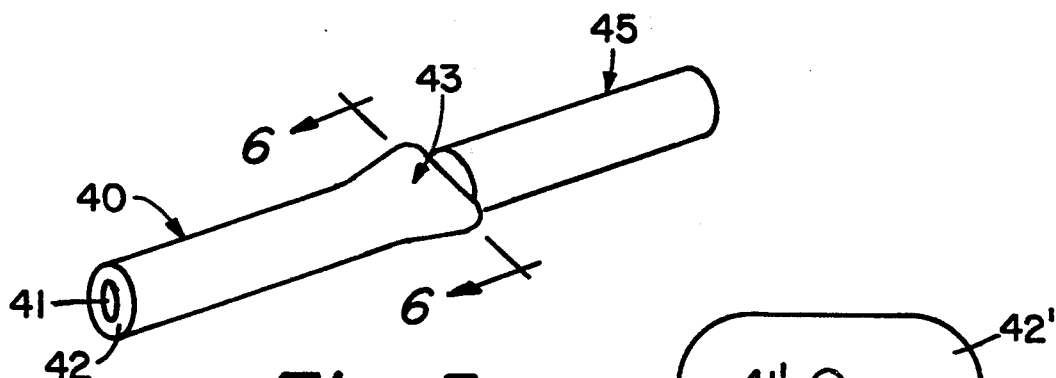
FIG. 5 is an oblique view of a further embodiment.
Figure 6:
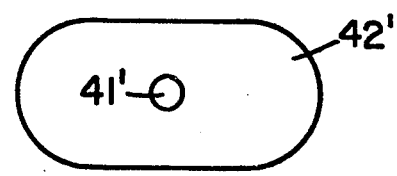
FIG. 6 is a cross-sectional view taken along lines 6—6 of FIG. 5.

Yet another technique for coupling an elliptical core fiber 40 to the standard single-mode fiber 45 is illustrated in FIG. 5. The elliptical core fiber, which is circular in cross-section, includes elliptically-shaped core 41 and cladding 42. The output end 43 of the elliptical core fiber is heated and flattened to cause cladding 42' to assume an elliptical cross-section and to cause the core 41' to become substantially circular in cross-section (see FIG. 6). Since it has a circular core, output end 43 can be connected end-to-end to standard single-mode fiber 45 by aligning their cores and fusing the fibers together or mechanically securing the fibers in the aligned position.

The aforementioned methods for coupling the elliptical fiber to the circularly symmetric fiber are capable of negligible loss, thereby preserving the high coupling efficiency of the elliptical core fiber to the laser diode.

The following theoretical example illustrates the improvement obtained by employing the fiber of the present invention to couple to a laser diode rather than a circularly symmetrical fiber, both fibers having conical lenses on their input ends. One commercially available laser diode has a mode radius in the parallel and perpendicular planes of 2.45 $\mu$m and 0.71 $\mu$m respectively. The core size of a commercially available step index elliptical core fiber was found to be 3.2 $\mu$m and 1.2 $\mu$m along the fibers' major and minor axes, respectively, and the core/clad $\Delta$ was 1.2%. The coupling efficiency between the laser diode and this elliptical mode field fiber was calculated to be 83%. The coupling efficiency would be even higher if the mode field of the elliptical core fiber had a higher aspect ratio. It is noted that the efficiency would typically drop by about 2 to 5% due to the coupler.

A small mode field diameter fiber is often used to couple laser diodes to fiber lasers. One such coupling fiber, which is circularly symmetrical, has a core diameter of 4 $\mu$m, a core/clad $\Delta$ of 1%, and a mode field of 4 $\mu$m. Calculations have shown that the theoretical coupling efficiency from the laser diode to this circular core fiber is 69%, a significantly lower coupling efficiency than with the elliptical core fiber.

We claim:

1. An optical system for efficiently coupling light from a source to a circularly symmetric fiber, said system comprising a radiation source for generating a beam of light having an elliptical mode field, an optical fiber having a core that is elliptically-shaped in cross-section, said optical fiber having input and output ends, said input end being situated in light receiving relationship with respect to said source, said fiber being oriented with respect to said source such that the mode field of said source is aligned with said fiber core to provide maximum overlap of the mode field of said elliptical core fiber with the mode field of said source, a single-mode circularly symmetric fiber, and means for coupling light from the output end of said elliptical core fiber to said circularly symmetric fiber without coupling through an intermediate fiber.

2. A system in accordance with claim 1 wherein said radiation source is a laser diode.

3. A system in accordance with claim 1 wherein said means for coupling comprises a fusion joint between said elliptical core fiber and said circularly symmetric fiber.

4. A system in accordance with claim 1 wherein said means for coupling comprises means for providing evanescent coupling between said elliptical core fiber and said circularly symmetric fiber.

5. A system in accordance with claim 4 wherein said means for coupling comprises a fusion joint between said elliptical core fiber and said circularly symmetric fiber, the diameters of said elliptical core fiber and said circularly symmetric fiber being smaller at said fusion joint than at the ends of said fibers opposite said fusion joint.

6. A system in accordance with claim 4 wherein said means for coupling comprises a coupling region in which an end portion of said elliptical core fiber and an end portion of said circularly symmetric fiber extend in side-by-side fashion, the diameters of said elliptical core fiber and said circularly symmetric fiber being smaller at said coupling region than at the ends of said fibers opposite said coupling region.

7. A system in accordance with claim 1 wherein said means for coupling comprises an end-to-end coupling region in which an endface of said elliptical core fiber and an endface of said circularly symmetric fiber are juxtaposed, said endface of said elliptical core fiber being flattened to the extent that the core thereof becomes round and the cladding thereof becomes elliptical in cross-section.

8. A system in accordance with claim 1 wherein said input end of said elliptical core fiber has a lens-shaped endface.

9. A system in accordance with claim 1 wherein said input end of said elliptical core fiber has an endface that is coated with an anti-reflection coating.

10. An optical system for efficiently coupling light from a source to a circularly symmetric fiber, said system comprising a laser diode for generating a beam of light having an elliptical mode field, a single-mode optical fiber having a core that is elliptically-shaped in cross-section, said optical fiber having input and output ends, said input end being situated in light receiving relationship with respect to said source, said fiber being oriented with respect to said source such that the mode field of said source is aligned with said fiber core to provide maximum overlap of the mode field of said elliptical core fiber with the mode field of said source, a signal-mode circularly symmetric optical fiber, and means for coupling light from the output end of said elliptical core fiber to said circularly symmetric fiber without coupling through an intermediate fiber.

11. A system in accordance with claim 1 wherein said elliptical core fiber and said circularly symmetric fiber are single-mode fibers.

* * * * *